(12) United States Patent
Szabó et al.

(10) Patent No.: US 6,567,425 B1
(45) Date of Patent: May 20, 2003

(54) BEARER INDEPENDENT SIGNALING PROTOCOL

(75) Inventors: István Szabó, Karcag (HU); Göran Eneroth, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/064,830

(22) Filed: Apr. 23, 1998

(51) Int. Cl.⁷ .................................................. H04J 3/12
(52) U.S. Cl. ................... 370/522; 370/467; 370/395.64
(58) Field of Search ................................ 370/522, 467, 370/395.1, 395.5, 395.6, 395.64; 709/227, 230

(56) References Cited

U.S. PATENT DOCUMENTS

| | | | | |
|---|---|---|---|---|
| 6,061,364 A | * | 5/2000 | Hager et al. | 370/467 |
| 6,178,181 B1 | * | 1/2001 | Glitho | 370/467 |

FOREIGN PATENT DOCUMENTS

| | | |
|---|---|---|
| EP | 0433364 | 8/1992 |
| EP | 0 569 180 A2 | 11/1993 |
| EP | 0 658 063 A2 | 6/1995 |
| EP | 0 805 576 A2 | 4/1997 |

OTHER PUBLICATIONS

Draft New ITU–T Recommendation I.363.2 "B–ISDN ATM Adaptation Layer Type 2 Specification", Editor: Pietro Schicker, Feb. 17–28, 1997, Seoul, pp. 1–29.

ITU–T Recommendation Q.2931 "B–ISDN Application Protocols for Access Signalling, Broadband Integrated Services Digital Network (B–ISDN)—Digital Subscriber Signalling System No. 2 (DSS)—User–Network Interface (UNI) Layer 3 Specification for Basic Call/Connection Control", Feb. 1995 pp. 1–245.

ITU–T Recommendation Q.2761 B–ISDN Application Protocols of the Network, Broadband Integrated Services Digital Network (B–ISDN)—Functional Description of the B–ISDN User Part (B–ISUP) of Signalling System No. 7, Feb. 1995, pp. 1–16.

ITU–T Recommendation Q.2762 "B–ISDN Application Protocols of the Network, Broadband Integrated Services Digital Network (B–ISDN)—General Functions of Messages and Signals of the B–ISDN User Part (B–ISUP) of Signalling System No. 7", Feb. 1995, pp. 1–18.

ITU–T Recommendation Q.2763 "B–ISDN Application Protocols of the Network, Broadband Integrated Services Digital Network (B–ISDN)—Signalling System No. 7 B–ISDN User Part (B–ISUP)—Formats and Codes", Feb. 1995, pp. 1–93.

(List continued on next page.)

Primary Examiner—Edwin C. Holloway, III

(57) ABSTRACT

In a telecommunications network, an ATM Adaptation Layer 2 (AAL2) signaling protocol is employed independent of the signaling bearer service being used in transport signaling messages to and from various network entities, such as mobile switching centers, radio network controllers and cell base stations in, for example, a mobile telecommunications network. This is achieved by dividing the functionality of the AAL2 signaling protocol into a number of functional sublayers including an AAL2 Signaling Common Part (CAP), a Bearer Coordination Part (BCP) and a Bearer Adaptor Part (BAP), wherein the BAP adjusts incoming and outgoing messages so that they are compatible with the AAL2 signaling protocol or the underlying signaling bearer service respectively.

40 Claims, 4 Drawing Sheets

OTHER PUBLICATIONS

ITU–T Recommendation Q.2764 "B–ISDN Application Protocols of the Network, Broadband Integrated Services Digital Network (B–ISDN)—Signalling System No. 7 B–ISDN User Part (B–ISUP)—Basic Call Procedures", Feb. 1995, pp. 1–142.

The ATM Forum Technical Committee, "Private Network–Network Interface Specification Version 1.0 (PNNI 1.0)", af–pnni–0055.000, Mar. 1996, pp. 1–366.

A. Patel et al., "The Need for an Advanced ATM Signalling Protocol", Computer Standards & Interfaces, vol. 18, No. 3, Jun. 1, 1996, pp. 259–274.

N. Modiri "An Implementation of the Common Network Management Information Service Element Interfaces", 2460 IEEE Communications Magazine, vol. 29, No. 7, Jul. 1, 1991, pp. 29–38.

T. Mukasa et al., "Proposals of Call Modeling for Intelligent Network Over Broadband ISDN", Globecom '95, IEEE Global Telecommunications Conference, Singapore, Nov. 14–16, 1995, vol. 2, pp. 1265–1271.

* cited by examiner

BEARER INDEPENDENT SIGNALING PROTOCOL

BACKGROUND

The present invention relates to signaling protocols in telecommunications networks (e.g., mobile networks). More particularly, the present invention relates to a telecommunications network signaling protocol that is independent of the underlying signaling bearer service.

Typically, networking systems employ what is known in the art as a layered architecture. In a layered architecture, data and/or signaling messages are transferred between peer entities on the same level of the layered architecture with the help of the services provided by the underlying layers. The messages exchanged between the peer entities are generated, formatted, transmitted, received and transported according to the rules described in a protocol specification. The functionality provided by an underlying layer for the layer above it, as well as the formatting and coding of the information that is exchanged between adjacent layers are described in an interface specification. An interface specification usually describes each function provided by the underlying layer in terms of a corresponding service primitive, wherein each primitive is associated with a particular function or service provided by the underlying layer for the layer just above it. Information exchanged between the layers is described in terms of parameters of a particular primitive.

A simple layered architecture may, from top to bottom, include an application layer, a network layer, a data link layer and a physical layer. The function of the application layer is to generate, process and format data and/or signaling that is required to support a particular user application (e.g., a cellular voice service). The function of the network layer is to manage the links and end-to-end relationships between the various network entities, for example, the various mobile switching centers, radio network controllers, and base station units in the cellular network. The data link layer provides means (i.e., links) for assured mode transfer of data and signaling between adjacent nodes in the network. The physical layer provides services which are required to interface with the physical environment, such as encoding, modulating, transmitting and receiving signals.

It will be understood that the layered architecture described above may include a signaling layer, wherein the signaling layer is actually part of the application layer or the network layer. The signaling layer, as the name suggests, generates and receives signaling messages, in accordance with a particular signaling protocol (e.g., Q.2931, PNNI, and B-ISUP). The signaling protocol provides the rules which govern the generation and format of the signaling messages. The signaling messages, in turn, are used, for example, to set-up maintain and release connections between network entities.

It will also be understood that a lower-layer network service, such as a signaling bearer service, is required to transport the signaling messages from a sending entity to a receiving entity. Examples of signaling bearer services include the Signaling ATM Adaptation Layer—User Network Interface (SAAL_UNI) service and the Message Transfer Part 3 (MTP3) service. Generally, in a layered architecture, the signaling bearer service is associated with the functional layers below the signaling layer.

Typically, different networks employ different signaling bearer services. In addition, signaling protocols are designed such that they are compatible with a particular signaling bearer service. For example, the ITU UNI signaling protocol (Q.2931) is designed such that it must be carried by the Signaling ATM Adaption Layer—User Network Interface (SAAL_UNI) signaling bearer service. Likewise, the Private Network-Network Interface (PNNI) signaling protocol must be carried by the SAAL_UNI signaling bearer service. However, the Broadband—Integrated Services Digital Network (B-ISDN) User Part (B-ISUP) signaling protocol is designed such that it must be carried by the Message Transfer Part (MTP3) bearer service associated with the Signaling System Seven (SS7). As telecommunications networks continue to overlap, interconnect and share services with each other, utilizing a signaling protocol that is incompatible with all but one signaling bearer service will become more problematic because it may restrict a user's access to and coverage within certain networks. It would, therefore, be highly desirable to have a signaling protocol that can generate, process and receive signaling messages independent of the underlying signaling bearer service.

SUMMARY OF THE INVENTION

It is an object of the present invention to provide a more flexible signaling protocol architecture.

It is an object of the present invention to provide a telecommunications network signaling protocol that is capable of generating signaling messages independent of the underlying signaling bearer service that is being used to transport the signaling messages.

It is an object of the present invention to provide a signaling protocol that can be used in conjunction with different telecommunications applications, networks, network segments, and markets, without having to first modify the signaling protocol.

The Asynchronous Transfer Mode, Adaptation Layer 2 (AAL2) is a well known mechanism that can be used for transferring data and signaling information, as described in ITU-T Recommendation No. I.363.2, "B-ISDN ATM Adaptation Layer Type 2 Specification," September 1997. It is expected that AAL2 will soon be widely used in conjunction with different telecommunications applications, networks and markets.

In general, the present invention involves an AAL2 signaling protocol that can now be employed regardless of the underlying signaling bearer service that is used for setting-up, maintaining and tearing-down end-to-end AAL2 connections. This is achieved by dividing the functionality of the AAL2 signaling protocol into a number of functional sublayers: an AAL2 Signaling Common Part (ACP), a Bearer Coordination Part (BCP) and a Bearer Adaptor Part (BAP), wherein the BCP makes it possible to dynamically switch between different signaling bearer services. The functions performed by each of these layers will be described in more detail below.

In accordance with one aspect of the present invention, the above-identified and other objects are achieved by a method for generating signaling messages in accordance with a signaling protocol that is independent of an underlying signaling bearer service. The method involves generating a signaling message independent of the underlying signaling bearer service to be used in transporting the message to a remote network node, then invoking a service primitive, wherein the signaling message is a parameter in the service primitive. The method then involves adapting the service primitive so that it is compatible with the underlying signaling bearer service.

In accordance with another aspect of the present invention, the above-identified and other objects are achieved by a method for receiving signaling messages in accordance with a signaling protocol independent of an underlying signaling bearer service. This method involves receiving an incoming message at a local network node, independent of the underlying signaling bearer service used to transport the incoming message from a remote network node, wherein the incoming message is a parameter in an incoming service primitive. The method also involves adapting the incoming service primitive from a format that is compatible with the underlying signaling bearer service to a format that is compatible with the signaling protocol.

In accordance with another aspect of the present invention, the above-identified and other objects are achieved by an apparatus for generating signaling messages that employs an AAL2 signaling protocol that is independent of an underlying signaling bearer service. The apparatus includes means for generating a message independent of the underlying signaling bearer service to be used in transporting the message to a remote network node, and means for invoking a service primitive, wherein the signaling message is a parameter in the service primitive. The apparatus also includes bearer adaptation means for converting the service primitive from a format that is compatible with the AAL2 signaling protocol to a format that is compatible with the underlying signaling bearer service.

In accordance with another aspect of the present invention, the above-identified and other objects are achieved by an apparatus for receiving signaling messages that employs an AAL2 signaling protocol independent of an underlying signaling bearer service. The apparatus includes means for receiving an incoming message independent of the underlying signaling bearer service, which is employed to transport the incoming message from a remote network node to a local network node, wherein the incoming message is a parameter in an incoming service primitive. The apparatus also includes bearer adaptation means for adjusting the service primitive from a format that is compatible with the underlying signaling bearer service to a format that is compatible with the AAL2 signaling protocol.

BRIEF DESCRIPTION OF THE DRAWINGS

The objects and advantages of the invention will be understood by reading the following detailed description in conjunction with the drawings in which.

DETAILED DESCRIPTION

Figure 1:
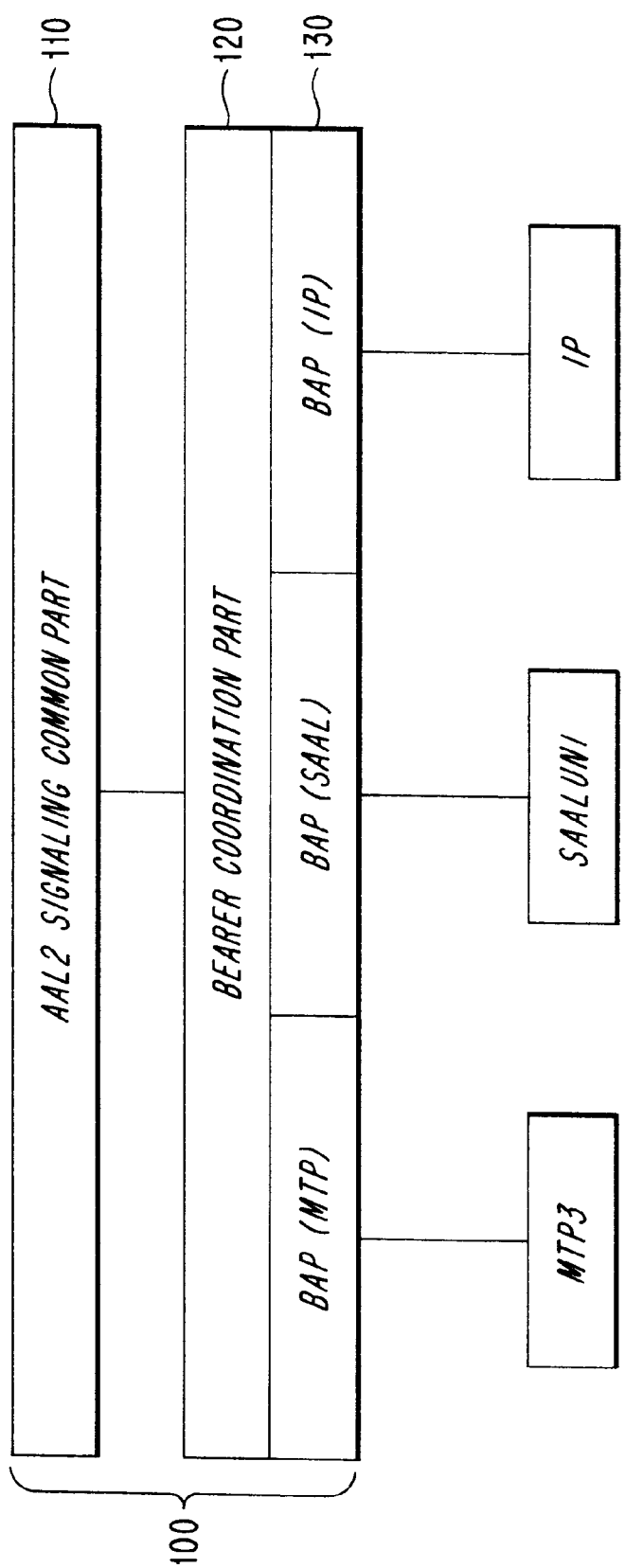
FIG. 1 shows the layered architecture of the AAL2 signaling protocol in accordance with a preferred embodiment of the present invention.

For a better understanding of the invention, the following detailed description refers to the accompanying drawings, wherein preferred exemplary embodiments of the present invention are illustrated and described. In addition, the reference numbers used to identify key elements of the invention in the drawings are consistent throughout.

As previously stated, the present invention involves an AAL2 signaling protocol that is capable of generating and receiving signaling messages independent of the underlying signaling bearer service. In accordance with a preferred embodiment of the present invention, this is accomplished by dividing the AAL2 signaling protocol into 3 functional sublayers.

FIG. 1 shows the layered architecture 100 for the AAL2 signaling protocol, in accordance with a preferred embodiment of the present invention, wherein the layered architecture 100 includes the following three functional sublayers: an AAL2 Signaling Common Part (ACP) 110, a Bearer Coordination Part (BCP) 120, and a Bearer Adaptor Part (BAP) 130. Each of these three functional sublayers will now be described in greater detail.

The upper-most functional sublayer is the ACP 110. The ACP 110 is essentially responsible for constructing the AAL2 signaling messages, which are used for establishing, maintaining and releasing AAL2 connections. In a preferred embodiment, the signaling messages are initially passed on to the signaling bearer service by the ACP 110. However, in order to transmit and/or receive signaling messages, the following primitives must be provided by the BCP 120 at the interface between the ACP 110 and the BCP 120: a BEARER_TRANSFER.REQUEST, a BEARER_TRANSFER.INDICATION, a BEARER_PAUSE.INDICATION, a BEARER_RESUME.INDICATION, a BEARER_STATUS.INDICATION, a BEARER_START.REQUEST, a BEARER_START.INDICATION, a BEARER_STOP.REQUEST, and a BEARER_STOP.INDICATION.

A BEARER_TRANSFER.REQUEST primitive is used to pass outgoing AAL2 signaling messages to the signaling bearer service. The parameters associated with a BEARER_TRANSFER.REQUEST primitive are the signaling message itself and the AAL2 address of the adjacent AAL2 switch to which the signaling bearer service is to transport the message. A BEARER_TRANSFER.INDICATION primitive is used to deliver incoming AAL2 signaling messages to the ACP 110. The parameters associated with a BEARER_TRANSFER.INDICATION primitive are the signaling message and the AAL2 address of the AAL2 switch that last processed the signaling message. A BEARER_PAUSE.INDICATION primitive is used to inform the ACP 110 that another AAL2 switch is not available. The parameter associated with a BEARER_PAUSE.INDICATION primitive is the AAL2 address associated with the unavailable AAL2 switch. A BEARER_RESUME.INDICATION primitive is used to inform the ACP 110 that another AAL2 switch, previously reported as being inaccessible, is now able to receive signaling messages. The parameter here is the AAL2 address of the previously unavailable AAL2 switch. A BEARER_STATUS.INDICATION primitive is used to report that another AAL2 switch is partially inaccessible because, for example, there is message traffic congestion or the signaling bearer service is unable to make contact with the ACP. Once again, the parameter is the AAL2 address of the affected AAL2 switch and a cause code. In general, the five primitives identified above are used when the signaling bearer is in service.

The following primitives identified herein below are used for controlling the state of the signaling bearer service. Unlike the primitives described above, there are no parameters associated with the following primitives. The first is the BEARER_START.REQUEST primitive, which solicits the signaling bearer service to switch to the ON state. The second is the BEARER_START.INDICATION primitive, which reports that the signaling bearer service is ready to convey AAL2 messages. The third is the BEARER_STOP.REQUEST primitive, which solicits the signaling bearer service to switch to an OFF state. The last is the BEARER_STOP.INDICATION primitive, which reports that signaling bearer service is now out-of-service and unable to transfer messages.

Figure 2:
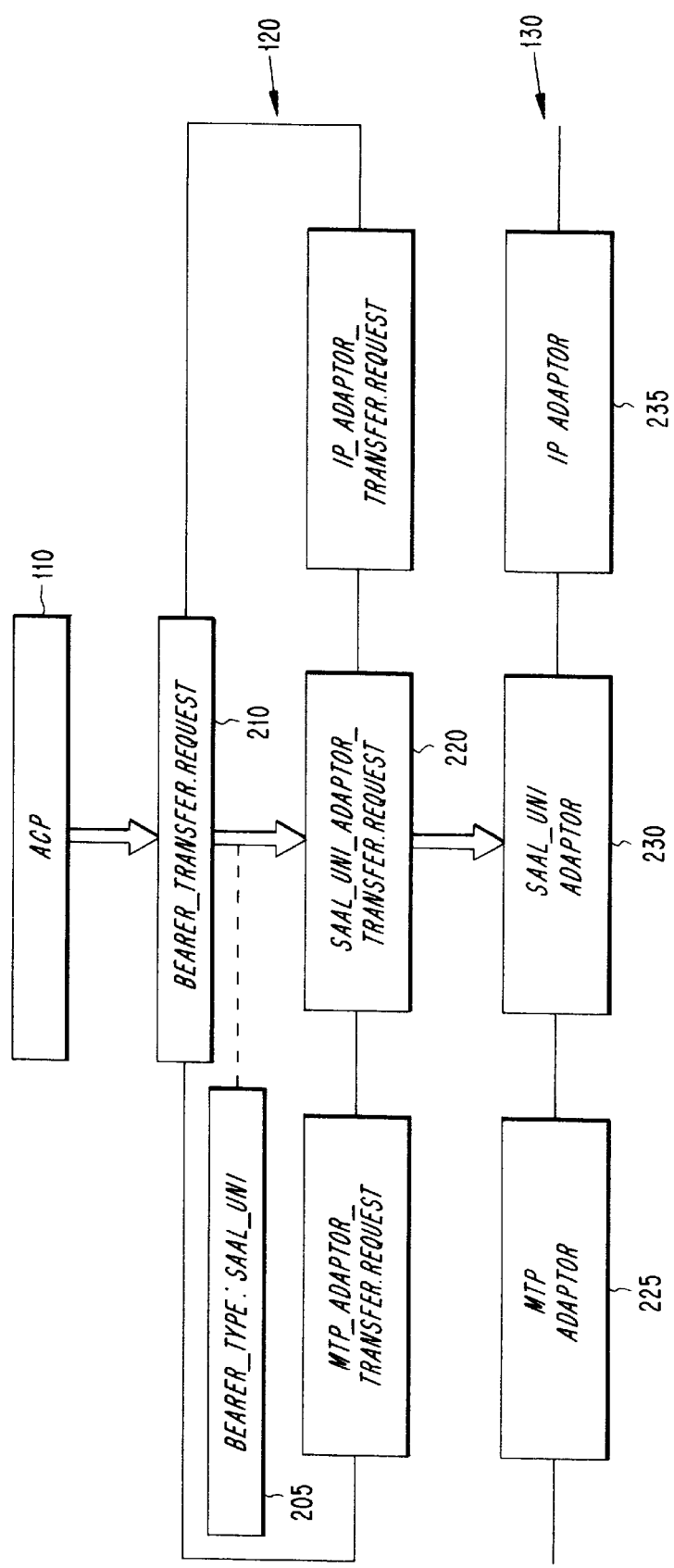
FIG. 2 illustrates the primitive mapping function of the Bearer Coordination Part in accordance with the preferred embodiment of the present invention.

FIG. 2 illustrates the mapping (i.e., distribution) function provided by the BCP 120. As shown, the BCP 120 maintains a state variable 205 called BEARER_TYPE. The state variable 205 identifies the bearer service (e.g., SAAL_UNI) being used to transport signaling messages. Upon receiving a primitive 210 (e.g., a BEARER_TRANSFER.REQUEST primitive) through its upper interface with the ACP 110, the BCP 120 translates the primitive 210 into a bearer-specific primitive (e.g., a SAAL UNI_ADAPTOR_ TRANSFER.REQUEST 220) by directing the message to the appropriate signaling bearer service adaptor in the BAP 130, in accordance with the state variable 205. It should be noted that the state variable 205 is set based on information that the BCP 120 receives from the system management. Furthermore, the state variable 205 may be reset by the system management at any time, thereby causing the BCP 120 to begin redirecting signaling messages to a different signaling bearer service adaptor without affecting the operation of the signaling protocol itself.

The primary function of the BAP 130 is to adapt or adjust a signaling message so that it becomes compatible with an intended one of a number of signaling bearer services. Accordingly, the BAP 130 includes a number of signaling bearer adaptors. In FIG. 2, three exemplary signaling bearer adaptors are illustrated: a MTP adaptor 225, a SAAL_UNI adaptor 230, and an IP adaptor 235. However, it will be understood that additional adaptors relating to other underlying signaling bearer services may be provided. Adapting a signaling message so that it is compatible with the intended signaling bearer service may involve translating the corresponding primitive, and it may involve adding or deleting parameter information depending upon the message and/or the particular signaling bearer service.

Figure 3:
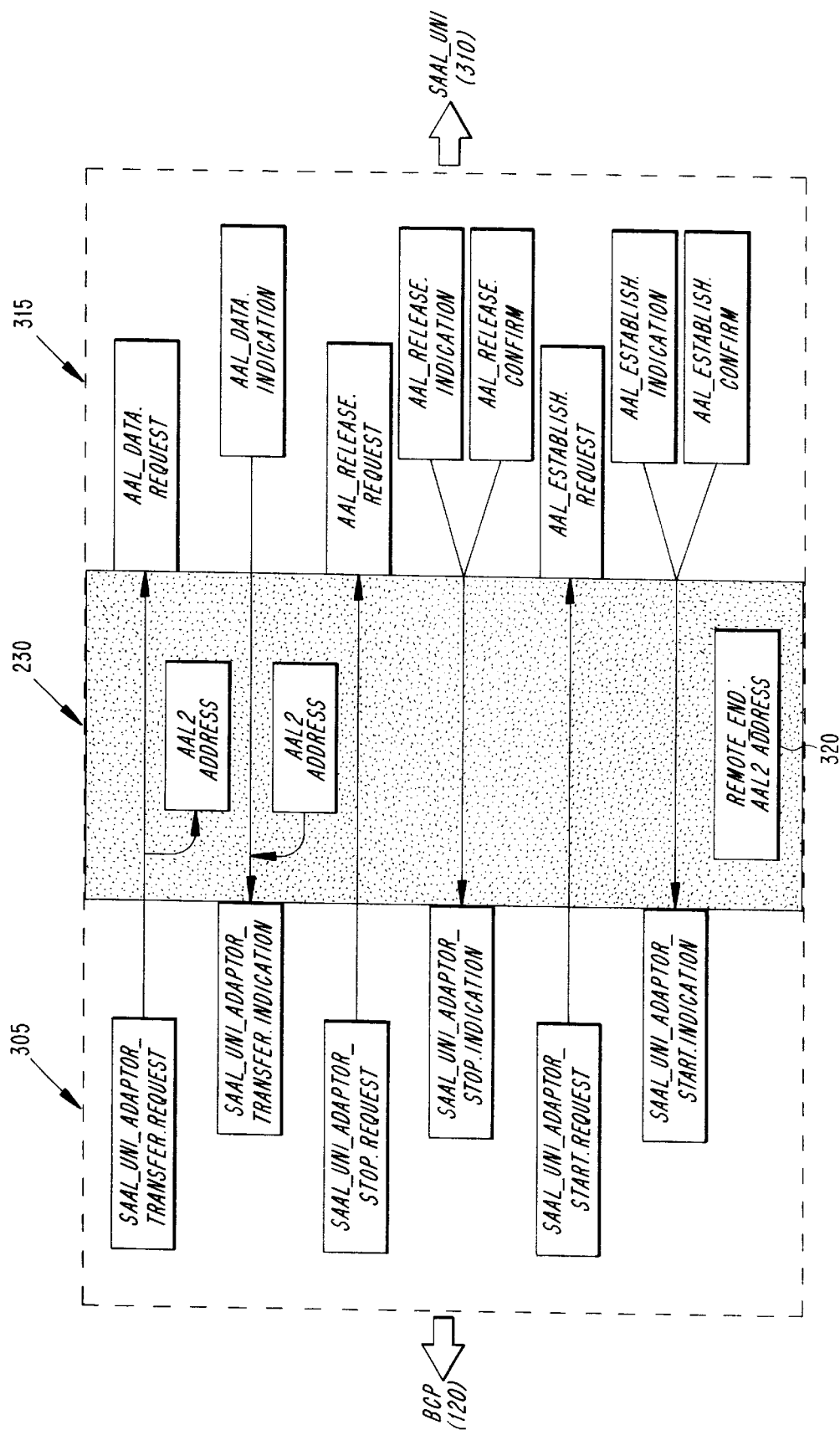
FIG. 3 illustrates an SAAL_UNI adaptor.

FIG. 3 illustrates the SAAL_UNI adaptor 230 in greater detail. More specifically, FIG. 3 shows the various incoming and outgoing primitives associated with the upper layer interface 305 between the SAAL_UNI adaptor 230 and the BCP 120. FIG. 3 also shows the various incoming and outgoing primitives associated with the lower layer interface 315 between the SAAL_UNI adaptor 230 and the SAAL_ UNI bearer service 310.

Most importantly, FIG. 3 illustrates how the SAAL_UNI adaptor 230 processes the various incoming and outgoing signaling messages. For example, the SAAL_UNI adaptor 230 will map a SAAL_UNI_ADAPTOR_ TRANSFER.REQUEST primitive to an AAL_ DATA.REQUEST primitive. However, only the signaling message itself is transferred. The AAL2 address is discarded. It is discarded because SAAL_UNI is a connection-based, link-level signaling bearer service, as those skilled in the art will appreciate. Consequently, there are only two AAL2 switches associated with the connection, that is one at either end of the connection. Thus, a signaling message sent by one AAL2 switch can only be transported to the other AAL2 switch located at the remote end of the connection. There are no other possible destinations. Accordingly, there is no requirement to include an AAL2 address among the parameters associated with an AAL_ DATA.REQUEST primitive, so the AAL2 address is discarded as shown.

Similarly, the SAAL_UNI adaptor 230 will map an AAL_DATA.INDICATION primitive to a SAAL_UNI_ ADAPTOR_TRANSFER.INDICATION primitive. However, the parameter associated with an AAL_ DATA.REQUEST primitive includes only the signaling message to be transferred. Because the AAL2 signaling protocol expects the primitive to include both the signaling message and the AAL2 address as parameters, the SAAL_ UNI adaptor 230 adds the AAL2 address, as shown in FIG. 3. The AAL2 address is stored in a state variable REMOTE_END 320, after the SAAL_UNI bearer connection is first established.

The START, STOP, RELEASE and ESTABLISH primitives are mapped by the SAAL_UNI adaptor 230 as shown. It should be noted that no additional processing is required, as there are no parameters associated with these primitives. It should also be noted that the SAAL_UNI adaptor 230 never invokes a SAAL_UNI_ADAPTOR_ PAUSE.INDICATION, a SAAL_UNI_ADAPTOR_ RESUME.INDICATION, or a SAAL_UNI_ADAPTOR_ STATUS.INDICATION, as the SAAL_UNI bearer service does not provide any functions related to these primitives.

Figure 4:
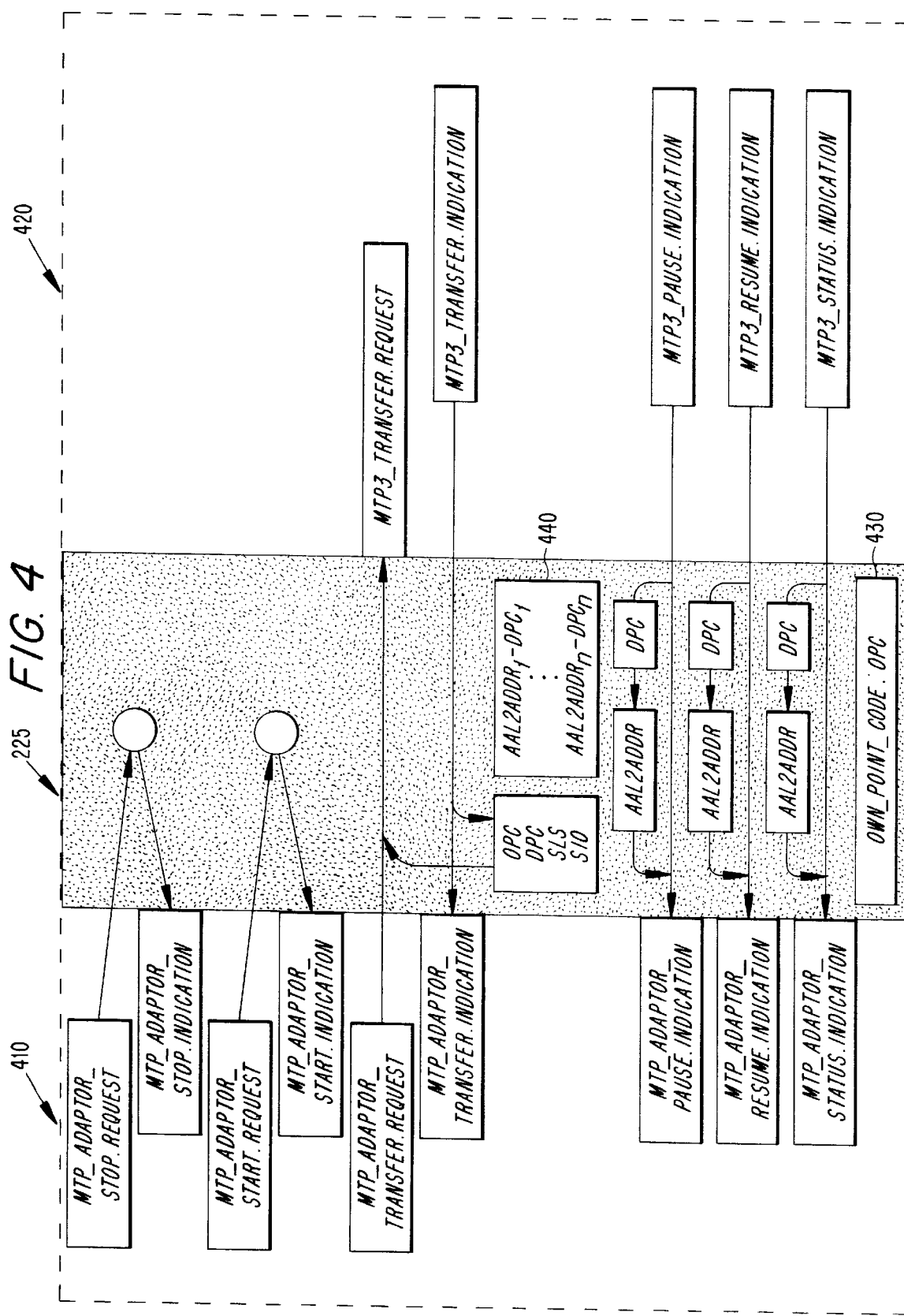
FIG. 4 illustrates an MTP adaptor.

FIG. 4 shows the MTP adaptor 225 in greater detail, as well as the various incoming and outgoing primitives associated with the upper interface 410 between the BCP 120 and the MTP adaptor 225, and the incoming and outgoing primitives associated with the lower interface 420 between the MTP adaptor 225 and the signaling bearer MTP3. In general, the MTP adaptor 225 performs address translation; message extension, as required, for inserting and removing MTP3 routing labels; and the mapping of primitives.

Unlike SAAL_UNI, MTP3 is a bearer that provides a packet transport service. Accordingly, message packets are routed from a sending entity to one of many possible receiving entities based on address information contained in the message packet. As such, MTP3 does not require connection set-up. Consequently, MTP3 does not utilize START and STOP primitives. However, this is irrelevant as far as the AAL2 signaling protocol is concerned, which continues to invoke START.REQUEST and STOP.REQUEST primitives and continues to expect START.INDICATION and STOP.INDICATION primitives in response. To accommodate the AAL2 signaling protocol, and to ensure that the AAL2 signaling protocol is truly bearer independent, the MTP adaptor 225, upon receiving a START.REQUEST or a STOP.REQUEST primitive through its upper interface 410 returns a START.INDICATION or a STOP.INDICATION primitive respectively without actually mapping any primitive to or from its lower interface 420.

As MTP3 is a packet transport service, as stated above, it relies on origination point and destination point information so that it can properly route the messages to and from the intended AAL2 nodes. In accordance with a preferred embodiment of the present invention, each MTP node in the SS7 network maintains its own unique point code (OPC) 430, wherein the OPC 430 is used to identify the MTP node from which a signaling message originates. In addition, each MTP adaptor, for example, MTP adaptor 225, maintains an address translation table 440. The address translation table 440 provides a list of each AAL2 address associated with each adjacent AAL2 node in the AAL2 overlay network, along with the destination point code (DPC) associated with the MTP node corresponding to each of the adjacent AAL2 nodes. The MTP adaptor 225 uses this information to process message transfer primitives and flow control primitives as will be explained in greater detail below.

When the MTP adaptor 225 receives a MTP_ ADAPTOR_TRANSFER.REQUEST primitive from the BCP 120, through its upper interface 410, it analyzes the address parameter to identify the AAL2 address of the adjacent AAL2 switch to which the outgoing message is to be transferred. Since MTP3 relies on DPCs rather than AAL2 address, the MTP adaptor 225 uses the address translation table to identify the DPC corresponding to the AAL2 address in the parameter. The MTP adaptor 225 then replaces the AAL2 address in the parameter with the corresponding DPC, as shown in FIG. 4. In addition, the MTP adaptor 225 attaches its OPC, as shown in FIG. 4, as required by the MTP3 signaling bearer service. In contrast, the OPC and the DPC are removed from the parameter for incoming TRANSFER.INDICATION primitives as shown.

The protocol used by the MTP3 bearer service requires two additional codes to be present as parameters of a TRANSFER.REQUEST primitive. These two additional codes are the Signaling Link Selection (SLS) code and the Signaling Information Octet (SIO) code. The purpose of these two additional codes will now be described in more detail.

The MTP3 signaling bearer supports more than one link between adjacent signaling nodes in the network. Typically, message traffic is evenly distributed across the several links. In doing so, message transfer capacity is increased and the service is more robust since alternative routes are available for message traffic when one or more links are inoperative. Proper coding of the SLS code helps the MTP3 layer to evenly distribute the message traffic over the available links. However, sometimes messages must arrive at their destination in a particular sequence. To insure that this occurs, the messages should be transported along the same route between the signaling nodes. By setting the SLS code to the same value for each of a number of messages, the SLS code helps to ensure that the messages are transported over the same route, in sequence, by the MTP3 bearer service. As shown in FIG. 4, the MTP adaptor 225 attaches the SLS to the parameter associated with outgoing TRANSFER.REQUEST primitives, and it removes them from the parameter associated with incoming TRANSFER.INDICATION primitives.

The SIO code is used to identify the specific MTP3 user. In the present case, for example, the SIO code identifies the AAL2 signaling protocol as a MTP3 user. As shown in FIG. 4, the MTP adaptor 225 inserts the SIO code as a parameter to each outgoing TRANSFER.REQUEST primitive, and it removes the parameter from each incoming TRANSFER.INDICATION primitive.

In addition to handling START, STOP and TRANSFER primitives, the MTP adaptor 225 must also handle certain incoming, flow control primitives. These include MTP3_PAUSE.INDICATION, MTP3_RESUME.INDICATION, and MTP3_STATUS.INDICATION primitives. Upon receiving any one of these three types of flow control primitives from the MTP3 bearer service, the MTP adaptor 225 first determines whether the DPC parameter in the primitive is listed in the address translation table 440. If the DPC is listed in the address translation table 440, this indicates that the message emanated from an adjacent AAL2 switch. The MTP adaptor 225 then identifies the corresponding AAL2 address in the address translation table 440 and inserts it as a parameter in the primitive, as required by the AAL2 protocol. In the case of a MTP3_STATUS.INDICATION primitive, a cause code provided by the MTP3 signaling bearer service is also inserted as a parameter. If, however, the DPC is not listed in the address translation table 440, the MTP adaptor 225 discards the message as it has been received from a non-adjacent AAL2 switch, and is unusable by the AAL2 signaling protocol.

While a preferred embodiment of the present invention has been described with respect to the SAAL_UNI and MTP3 signaling bearer services, it will be understood that other embodiments are feasible which include adaptors relating to other signaling bearer services. Other candidate signaling bearer services include IP, TCP/IP and SAAL_NNI bearer services.

The present invention has been described with reference to a preferred embodiment. However, it will be readily apparent to those skilled in the art that it is possible to embody the invention in specific forms other than as described above without departing from the spirit of the invention. The preferred embodiment is illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunications network, a method for generating signaling messages in accordance with a signaling protocol that is independent of an underlying signaling bearer service, said method comprising the steps of:

generating a signaling message independent of the underlying signaling bearer service to be used in transporting the message to a remote network node;

invoking a service primitive, wherein the signaling message is a parameter in the service primitive; and adapting the service primitive so that it is compatible with the underlying signaling bearer service.

2. The method of claim 1 further comprising the step of:

distributing the service primitive to one of a plurality of bearer adaptors, wherein each of the plurality of bearer adaptors corresponds to a different signaling bearer service.

3. The method of claim 1, wherein the signaling bearer service is a SAAL_UNI bearer service.

4. The method of claim 3, wherein said step of adapting the service primitive so that it is compatible with the underlying signaling bearer service comprises the step of:

removing an address parameter from the service primitive, wherein the address parameter is associated with the remote network node.

5. The method of claim 3, wherein said step of adapting the service primitive so that it is compatible with the underlying signaling bearer service comprises the steps of:

mapping a TRANSFER.REQUEST primitive to a DATA.REQUEST primitive; and forwarding the DATA.REQUEST primitive to the SAAL_UNI signaling bearer service.

6. The method of claim 3 further comprising the steps of:

invoking a STOP.REQUEST primitive;

mapping the STOP.REQUEST primitive to a RELEASE.REQUEST primitive; and forwarding the RELEASE.REQUEST primitive to the SAAL_UNI signaling bearer service.

7. The method of claim 3 further comprising the steps of:

invoking a START.REQUEST primitive;

mapping the START.REQUEST primitive to an ESTABLISH.REQUEST primitive; and forwarding the ESTABLISH.REQUEST primitive to the SAAL_UNI signaling bearer service.

8. The method of claim 1, wherein the signaling bearer service is an MTP3 bearer service.

9. The method of claim 8, wherein said step of adapting the service primitive so that it is compatible with the underlying signaling bearer service comprises the step of:

inserting an identification code into the service primitive, as a parameter, wherein the identification code corresponds to a MTP node responsible for issuing the signaling message.

10. The method of claim 8, wherein said step of adapting the service primitive so that it is compatible with the underlying signaling bearer service comprises the steps of:
   identifying an address parameter in the service primitive, wherein the address parameter corresponds to the remote network node;
   using the address parameter to ascertain an identification code for a MTP node associated with the remote network node; and
   replacing the address parameter with the identification code.

11. The method of claim 8, wherein said step of adapting the service primitive so that it is compatible with the underlying signaling bearer service comprises the step of:
   inserting a link select code into the service primitive, as a parameter, wherein the link select code identifies one of a plurality of links over which the message can be transported to the remote network node.

12. The method of claim 8, wherein said step of adapting the service primitive so that it is compatible with the underlying signaling bearer service comprises the step of:
   inserting a signaling information code into the service primitive, as a parameter, wherein the signaling information code identifies the signaling protocol as a MTP user.

13. The method of claim 8, wherein said step of adapting the service primitive so that it is compatible with the underlying signaling bearer service comprises the steps of:
   mapping an MTP_ADAPTOR_TRANSFER.REQUEST primitive to a MTP3_TRANSFER.REQUEST primitive; and
   forwarding the MTP3_TRANSFER.REQUEST primitive to the MTP3 bearer service.

14. The method of claim 8 further comprising the steps of:
   invoking a STOP.REQUEST primitive;
   mapping the STOP.REQUEST primitive to a STOP.INDICATION primitive; and
   forwarding the STOP.INDICATION primitive back to said message generation means.

15. The method of claim 8 further comprising the steps of:
   invoking a START.REQUEST primitive;
   mapping the START.REQUEST primitive to a START.INDICATION primitive; and
   forwarding the START.INDICATION primitive back to said message generation means.

16. In a telecommunications network, a method for receiving signaling messages in accordance with a signaling protocol independent of an underlying signaling bearer service, said method comprising the steps of:
   receiving an incoming message at a local network node, independent of the underlying signaling bearer service used to transport the incoming message from a remote network node, wherein the incoming message is a parameter in an incoming service primitive; and
   adapting the incoming service primitive from a format that is compatible with the underlying signaling bearer service to a format that is compatible with the signaling protocol.

17. The method of claim 16 further comprising the step of:
   distributing the service primitive from one of a plurality of bearer adaptors to the signaling protocol, wherein each of the plurality of bearer adaptors corresponds to a different signaling bearer service.

18. The apparatus of claim 16, wherein the signaling bearer service is a SAAL_UNI bearer service.

19. The method of claim 18, wherein said step of adapting the incoming service primitive from a format that is compatible with the underlying signaling bearer service to a format that is compatible with the signaling protocol comprises the step of:
   inserting an address into the service primitive, as a parameter, wherein the address is associated with the remote network node.

20. The method of claim 18, wherein said step of adapting the incoming service primitive from a format that is compatible with the underlying signaling bearer service to a format that is compatible with the signaling protocol comprises the steps of:
   mapping a DATA.INDICATION primitive to a TRANSFER.INDICATION primitive; and
   forwarding the TRANSFER.INDICATION primitive to an incoming message receiving means.

21. The method of claim 18 further comprising the steps of:
   mapping a RELEASE.INDICATION primitive to a STOP.INDICATION primitive;
   mapping a RELEASE.CONFIRM primitive to a STOP.INDICATION primitive; and
   forwarding the STOP.INDICATION to an incoming message receiving means.

22. The method claim 18 further comprising the steps of:
   mapping an ESTABLISH.INDICATION primitive to a START.INDICATION primitive;
   mapping an ESTABLISH.CONFIRM primitive to a START.INDICATION primitive; and
   forwarding the START.INDICATION to an incoming message receiving means.

23. The method of claim 16, wherein the signaling bearer service is an MTP3 bearer service.

24. The method of claim 23 further comprising the step of:
   removing an identification code parameter from a second service primitive, wherein the identification code corresponds to an MTP node associated with the remote network node.

25. The method of claim 24, further comprising the steps of:
   using the identification code to identify an address corresponding to the remote network node; and
   inserting the address corresponding to the remote network node into the service primitive, as a parameter, in place of the identification code parameter.

26. The method of claim 25, wherein the second service primitive is a PAUSE.INDICATION primitive.

27. The method of claim 25, wherein the second service primitive is a RESUME.INDICATION primitive.

28. The method of claim 25, wherein the second service primitive is a STATUS.INDICATION primitive.

29. The method of claim 23, wherein said step of adapting the service primitive from a format that is compatible with the underlying signaling bearer service to a format that is compatible with the signaling protocol comprises the step of:
   removing an identification code parameter from the service primitive, wherein the identification code corresponds to the remote network node.

30. The method of claim 23, wherein said step of adapting the service primitive from a format that is compatible with the underlying signaling bearer service to a format that is compatible with the signaling protocol comprises the step of:

removing an identification code parameter from the service primitive, wherein the identification code corresponds to the local network node.

31. The method of claim 23, wherein said step of adapting the service primitive from a format that is compatible with the underlying signaling bearer service to a format that is compatible with the signaling protocol comprises the step of:

removing a link select code parameter from the service primitive, wherein the link select code identifies a link over which the incoming message was transported from the remote network node.

32. The method of claim 23, wherein said step of adapting the service primitive from a format that is compatible with the underlying signaling bearer service to a format that is compatible with the signaling protocol comprises the step of:

removing a signaling information code parameter from the service primitive, wherein the signaling information code identifies the signaling protocol as a MTP user.

33. In a telecommunications network, an apparatus for generating signaling messages that employs an AAL2 signaling protocol that is independent of an underlying signaling bearer service, said apparatus comprising:

means for generating a message independent of the underlying signaling bearer service to be used in transporting the message to a remote network node;

means for invoking a service primitive, wherein the signaling message is a parameter in the service primitive; and bearer adaptation means for converting the service primitive from a format that is compatible with the AAL2 signaling protocol to a format that is compatible with the underlying signaling bearer service.

34. The apparatus of claim 33 further comprising:

bearer service coordination means for distributing the service primitive containing the signaling message from said message generation means to one of a plurality of bearer adaptation means, wherein each of the plurality of bearer adaptation means corresponds to a different signaling bearer service.

35. The apparatus of claim 33, wherein the signaling bearer service is a SAAL_UNI bearer service and said bearer adaptation means is a SAAL_UNI adaptor.

36. The apparatus of claim 33, wherein the signaling bearer service is an MTP3 bearer service and said bearer adaptation means is a MTP adaptor.

37. In a telecommunications network, an apparatus for receiving signaling messages that employs an AAL2 signaling protocol independent of an underlying signaling bearer service, said apparatus comprising:

means for receiving an incoming message independent of the underlying signaling bearer service, which is employed to transport the incoming message from a remote network node to a local network node, wherein the incoming message is a parameter in an incoming service primitive; and bearer adaptation means for adjusting the service primitive from a format that is compatible with the underlying signaling bearer service to a format that is compatible with the AAL2 signaling protocol.

38. The apparatus of claim 37 further comprising:

bearer service coordination means for distributing the service primitive from one of a plurality of bearer adaptation means to said incoming message receiving means, wherein each of the plurality of bearer adaptation means corresponds to a different signaling bearer service.

39. The apparatus of claim 37, wherein the signaling bearer service is a SAAL_UNI bearer service and said bearer adaptation means is a SAAL_UNI adaptor.

40. The apparatus of claim 37, wherein the signaling bearer service is an MTP3 bearer service and said bearer adaptation means is a MTP adaptor.

* * * * *